United States Patent [19]

Schmidt et al.

[11] Patent Number: 5,439,625
[45] Date of Patent: Aug. 8, 1995

[54] TRACK CROSSING INSTALLATION, MOLDED BODY FOR A TRACK CROSSING INSTALLATION AND METHOD FOR PRODUCING A MOLDED BODY FOR A TRACK CROSSING INSTALLATION

[75] Inventors: Peter Schmidt; Peter Michalkiewicz, both of Waldkraiburg, Germany

[73] Assignee: Gummiwerk Kraiburg Development GmbH, Waldkraiburg, Germany

[21] Appl. No.: 164,378

[22] Filed: Dec. 9, 1993

Related U.S. Application Data

[63] Continuation-in-part of Ser. No. 44,130, Apr. 7, 1993, abandoned.

[30] Foreign Application Priority Data

Sep. 2, 1992 [DE] Germany ............... 42 29 289.1
Sep. 2, 1993 [EP] European Pat. Off. ........ 93114097

[51] Int. Cl.⁶ ........................................... B29C 39/12
[52] U.S. Cl. ....................................... 264/71; 264/112; 264/113; 264/DIG. 69
[58] Field of Search .............. 264/109, 122, 112, 71, 264/113, 115, DIG. 69

[56] References Cited

U.S. PATENT DOCUMENTS

| | | |
|---|---|---|
| 1,689,278 | 10/1928 | Crabbs . |
| 2,126,948 | 8/1938 | Dewhirst . |
| 2,454,910 | 11/1948 | Carr . |
| 3,022,712 | 2/1962 | Cousino . |
| 3,324,213 | 6/1967 | Anfinset . |
| 3,378,617 | 4/1968 | Elmendorf . |
| 3,597,425 | 8/1971 | Shaines . |
| 3,894,686 | 7/1975 | Weinberg . |
| 4,160,761 | 7/1979 | Prusinski . |
| 4,272,211 | 6/1981 | Sabel . |
| 4,365,743 | 12/1982 | Trickel . |
| 5,094,905 | 3/1992 | Murray ................. 428/218 |
| 5,106,554 | 4/1992 | Drews ................... 264/112 |
| 5,171,497 | 12/1992 | Osada ................... 264/112 |

FOREIGN PATENT DOCUMENTS

| | | |
|---|---|---|
| 0281013 | 9/1988 | European Pat. Off. . |
| 2395353 | 3/1979 | France . |
| 2418299 | 9/1979 | France . |
| 235224 | 5/1985 | Germany . |
| 650541 | 7/1985 | Switzerland . |
| 2221643 | 2/1990 | United Kingdom . |

OTHER PUBLICATIONS

WO91/15631 Oct. 17, 1991.

*Primary Examiner*—Mary Lynn Theisen
*Attorney, Agent, or Firm*—Brumbaugh, Graves, Donohue & Raymond

[57] ABSTRACT

The molded bodies (22, 28) of a track crossing construction are coated with hard material particles (27) at least in a layer close to the traffic-carrying surface so as to improve the traction properties of vehicle tires and to enhance the nonskid properties.

28 Claims, 13 Drawing Sheets

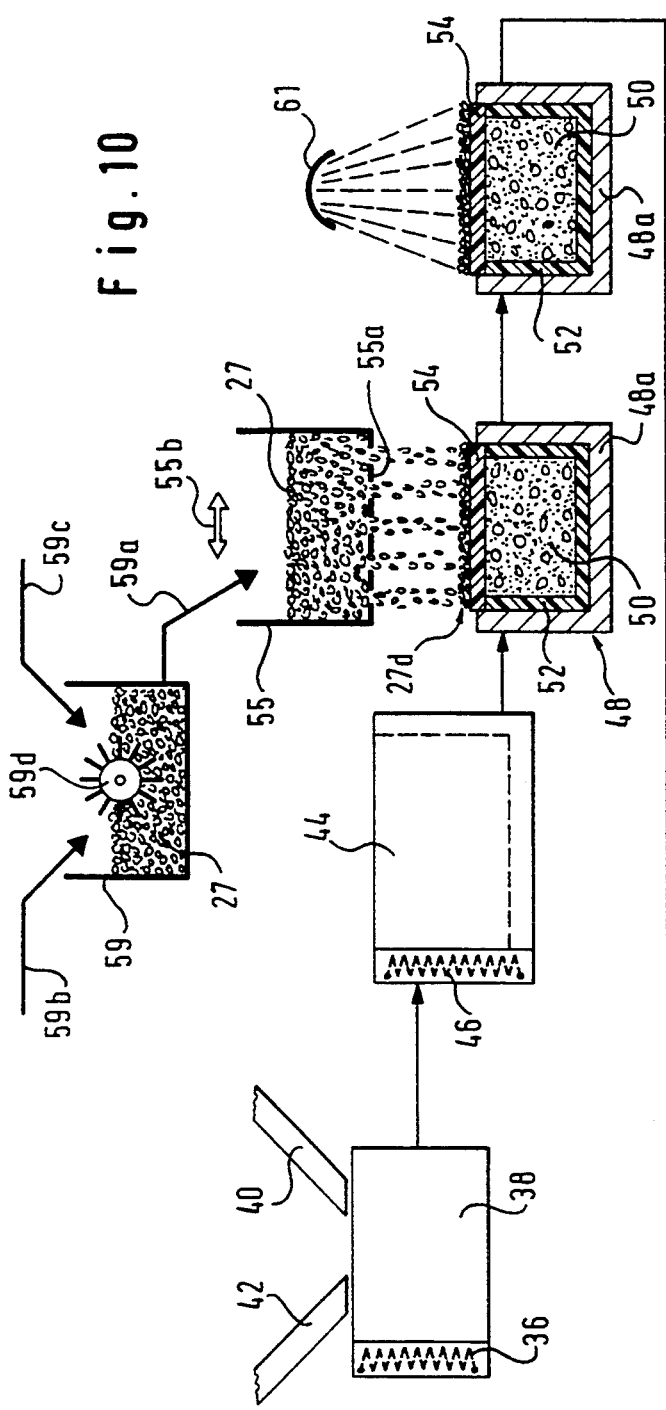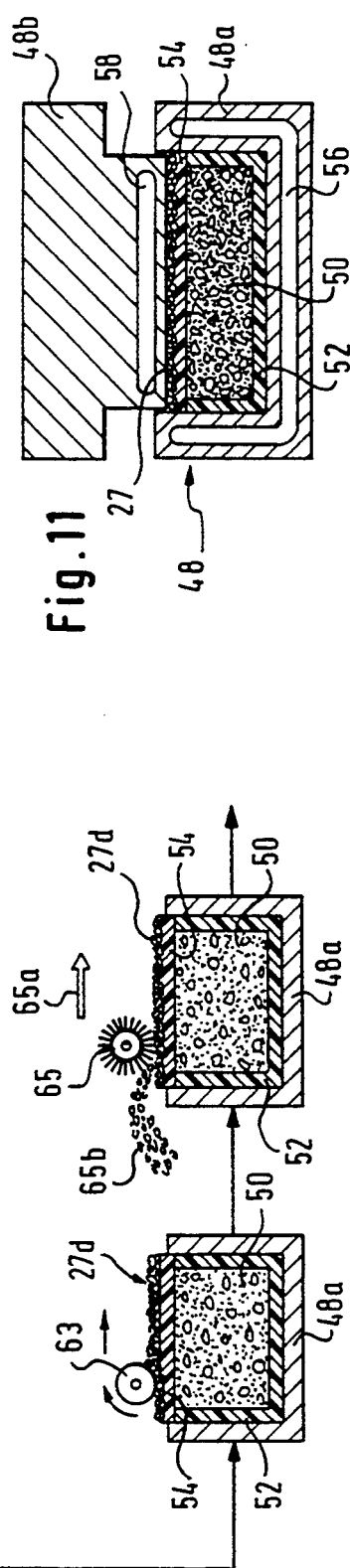

TRACK CROSSING INSTALLATION, MOLDED BODY FOR A TRACK CROSSING INSTALLATION AND METHOD FOR PRODUCING A MOLDED BODY FOR A TRACK CROSSING INSTALLATION

This application is a continuation-in-part application of prior pending application Ser. No. 08/044,130, filed Apr. 7, 1993, now abandoned.

BACKGROUND OF THE INVENTION

The present invention relates to a track crossing installation at a railroad yard including a covering which comprises rubber-based molded bodies adjoining each other in horizontal direction, this cover resting on the track frame and/or on ballast material.

STATEMENT OF THE PRIOR ART

Such a track crossing installation is known from German Patent Document DE 40 11 599 A1.

To attain sufficient traction adhesion as well as to avoid slipping of the tires of vehicles driving over the track crossing installation, it has been provided in accordance with Document DE 40 11 599 A1 to mold or embed spikes in the traffic-carrying surface. The spike solution was selected because it was hoped and expected that it would exhibit the best traction and non-slip properties at especially critical spots of a road system. It has now been found that traction and non-slip properties at track crossings are improved advantageously when at least a portion of the molded bodies in a covering contains hard material particles at least in a layer adjoining the traffic-carrying surface.

Installation of hard material particles in molded rubber bodies is known per se, for example from International Patent Document WO 89/06670 and German Patent Document DD 235 224 A5. In both cases, there is involved the equipment of the casing of tires with hard material particles. However, the circumstances there are completely different, because a tire is in continuous engagement with a road surface, while there is only occasional crossing of a track crossing structure. The demands on service life and operational qualities of a track crossing structure are different from those made on a vehicle tire.

It is also already known from U.S. Pat. No. 4,160,761 to incorporate hard material particles, i.e. silica sand, as a filler in molded plastic bodies intended as a layer on traffic surfaces used by vehicles. Here, too, the special situation in connection with track crossing structures had not been considered.

SUMMARY OF THE INVENTION

A track crossing installation at a railroad yard includes a covering which comprises rubber-based molded bodies having a traffic-carrying surface and adjoining each other in horizontal direction, this covering resting on the track frame and/or on ballast material. At least a part of the molded bodies comprises hard material particles bonded to at least a layer adjoining the traffic-carrying surface.

It has been found that especially in track crossing installations hard material particles exhibit considerable advantages over spikes, in that the height of the hard material particles above the respective surface of the molded bodies adapts better to the respective state of wear and remains approximately the same at the statistical mean during its entire life. This results in constant traction and non-slip properties during the entire time of use of a track crossing structure and has the additional advantage that the danger of catching and stumbling when walking across the track crossing structure is reduced in comparison with spike-equipped structures.

With respect to optimum traction and non-slip properties, it is provided that in the unused state or at least after a short period of use the hard material particles are bared and/or protrude out from the traffic-carrying surface.

Examples of hard material particles are: corundum particles and/or metal carbide particles and/or metallic nitride particles and/or metallic oxide particles.

Incidentally, with respect to the material properties of the hard material particles supplemental reference is made to the disclosures in the above-mentioned Documents WO 89/06670 and DD 235 224 A5.

The hard material particles can be coated with an organic bonding agent layer, in particular a synthetic resin adhesive layer. The need for such a bonding agent layer depends on whether or not there already exist sufficient adhesive properties between the hard material particles and the basic components of the respective molded bodies.

The preferred size of the hard material particles ranges between approximately 0.5 mm and approximately 4 mm. The sizes here mentioned are based on a measurement by means of a screen having an appropriate linear mesh width.

The present invention also relates to the molded bodies destined and suitable for the construction of track crossing installations, which contain hard material particles bonded at least to a layer adjoining the traffic-carrying surface.

Basically all conventional adhesives with high adhesive properties to the hard material particles on the one hand and the molded body material on the other hand can be considered as binder materials. Solvent-based adhesives and water-soluble adhesives are suitable adhesives. In this connection, there is the particular requirement that on the one hand the bonding agents cure rapidly enough to prevent the gumming up of their treating, charging and conveying means, but on the other hand still have sufficient adhesive properties at the time of their final contact with the molded body material.

According to a preferred embodiment, it is provided that the respective molded body has in its traffic-carrying surface depressions and that the concentration of the hard material particles within the range of these depressions is lower than within the surface ranges of the traffic-carrying surface beyond these depressions. By the incorporation of such depressions, the traction and non-slip properties can still be improved. By the restricted application of the hard material particles substantially to the surface regions of the traffic-carrying surface outside the depressions, the traction and non-slip properties can still be improved in case of a given amount of hard material particles.

The depressions may e.g. have the shape of channels. These channels can also fulfill water discharging functions. This water discharging function is substantially improved if one observes that the contact surfaces of the channels are substantially free from toughening hard material particles.

With respect to the water discharging function of the channels, it is suggested that the channels terminate in border faces of the molded body.

The channels may extend substantially straight-lined across the traffic-carrying surface. A preferred embodiment provides that a plurality, preferably two bands of channels parallel to each other within the respective band are provided, the channels of the individual bands crossing each other. In such case, rhombic raised surface ranges are defined. If the diagonals of the rhombus have different lengths, the short or the long rhombus diagonals can selectively be laid in driving direction. This depends on the type of traffic to be expected. If, e.g., high-density bicycle traffic is expected, it is advisable to lay the long diagonals of the rhombus transversely with respect to the general driving direction in order to avoid that the steering behavior of bicycles is adversely affected.

According to another aspect, the present invention relates to a method for producing a molded body for a track crossing installation or a molded body for forming other traffic surfaces. In this connection, the general teaching is that hard material particles are admixed to a curable mold material intended for forming at least one layer adjoining the traffic-carrying surface, that this mold material is then molded to form at least a layer adjacent the traffic-carrying surface, and that the mold material is then allowed to cure.

According to a first alternative, this teaching is realized by admixing hard material particles to a particulate filler material, mixing this filler material with a curable binder material, forming the thus obtained mixture to the molded body or at least to the layer close to the traffic-carrying surface, and to allow the binder material to cure. According to another alternative for realizing the teaching of the present invention, it is provided that hard material particles are admixed to a binder material, that this binder material is then mixed with a particulate filler material, that the thus obtained mixture is molded, and that the binder material is then allowed to cure.

In all cases the particulate filler material may be particulate vulcanized waste rubber material. The binder material may be vulcanizable raw rubber, but also thermoplastic binder materials, particularly polyolefin-based ones may be used.

Also the chronological course of the process can be varied in many ways.

For example, it is possible to mold a mold material to obtain the molded body or a layer close to the traffic-carrying surface of the molded body, to sprinkle the hard material particles onto the traffic-carrying surface, and to allow the traffic-carrying surface or the layer, respectively, to cure. In connection with such a process, the adhesion between the hard material particles and the mold material can be improved by pressing the sprinkled-on hard material particles into a layer close to the traffic-carrying surface and then allowing this layer to cure. In order to avoid greater losses of hard material particles, one may want to sweep off the non-bonded portion of the sprinkled-on particles, optionally also after having impressed the hard material particles into the traffic-carrying surface.

An advantageous method in view of a reduced raw material use includes coating a core region of a molded body consisting of particulate waste rubber material and vulcanizable raw rubber mixture with a layer of vulcanizable raw rubber so that the layer of vulcanizable raw rubber forms the traffic-carrying surface, sprinkling then hard material particles onto the traffic-carrying surface and pressing these hard material particles, if desired, into the traffic-carrying surface, and vulcanizing then the vulcanized raw rubber mixture in the core region and in the layer close to the traffic-carrying surface at the same time.

In order to achieve good adhesion of the hard material particles to the traffic-carrying surface, it is advantageous to coat the hard material particles with an organic curable bonding agent and to incorporate the hard material particles into the mold material at a state at which the bonding agent is still capable of being bonded into the mold material.

If molded bodies should be produced whose traffic-carrying surfaces include in addition to hard material particles also a surface profiling improving the traction and non-skid properties, one will have to provide that a lower mold is used which has a vertically upwardly directed bottom surface with upwardly directed projections, that hard material particles are sprinkled onto this bottom surface such that these hard material particles accumulate substantially between the projections on the bottom surface, and that a curable mold material is poured into the lower mold and cured. In this connection, the concentration of hard material particles onto the raised regions of the traffic-carrying surface can be increased by subjecting the lower mold to a shaking motion so that the hard material particles accumulate preferably in the regions beyond the projections.

The method which comprises the sprinkling of hard material particles onto the bottom surface of a lower mold includes the following steps: Applying onto the bottom surface of the lower mold over the sprinkled-on hard material particles a binder material layer and applying a mixture of binder material and particulate filler material onto this binder material layer, and simultaneously curing this binder material with the binder material of the binder material layer. The mold material can then be subjected to pressure within the lower mold by inserting an upper mold into the lower mold.

Also in the method being based on the sprinkling of hard material particles onto the bottom surface of a lower mold, one may use as binder material vulcanizable raw rubber or thermoplastic binder materials, especially polyolefin-based ones. On account of its inexpensive availability, here again vulcanized waste rubber material is considered as a particulate filler material, which can be recovered in large quantities by comminution of tires.

Before being sprinkled onto the bottom surface of a lower mold, the hard material particles may be coated with a bonding agent.

In order to achieve immediately after installation of the molded bodies into a road surface an optimum of improved traction and non-skid properties, the traffic-carrying surface of the molded body may be subjected after the curing of the curable mold material to a roughening treatment in order to set free tips and edges of a possibly big quantity of hard material particles.

The roughening treatment can be facilitated and made more effective by incorporating into the traffic-carrying surface of the molded body prior to its curing a roughening agent which is less adhesive with respect to the hard material particles and the cured mold material than the hard material particles with respect to the cured mold material, and by removing, if desired, the roughening agent at least partially after the curing of the mold material. The incorporation of the roughening agent can advantageously be applied if no roughening treatment at all is effected. It has shown that in case of the incorporation of the roughening agent into the traffic-carrying surface of the molded body the desired roughening is very rapidly caused by the traffic itself. Only if an especially even and intensive surface roughness is demanded already immediately after the installation of the molded bodies, one will suitably carry out a roughening treatment prior to or immediately after the installation of the molded bodies.

In connection with methods wherein the hard material particles are sprinkled onto the bottom surface of a lower mold, the toughening agent can be applied onto the bottom surface prior to or simultaneously with the hard material particles.

BRIEF DESCRIPTION OF THE DRAWINGS The attached drawing figures illustrate exemplary embodiments of the invention.

FIG. 10 is a schematic view of an installation for producing molded bodies with a covering skin;

FIG. 11 is a sectional view of a vulcanizing mold for producing molded bodies with a thermoplastic binder and without covering skin;

DETAILED DESCRIPTION OF THE PREFERRED EMBODIMENTS

Figure 1:
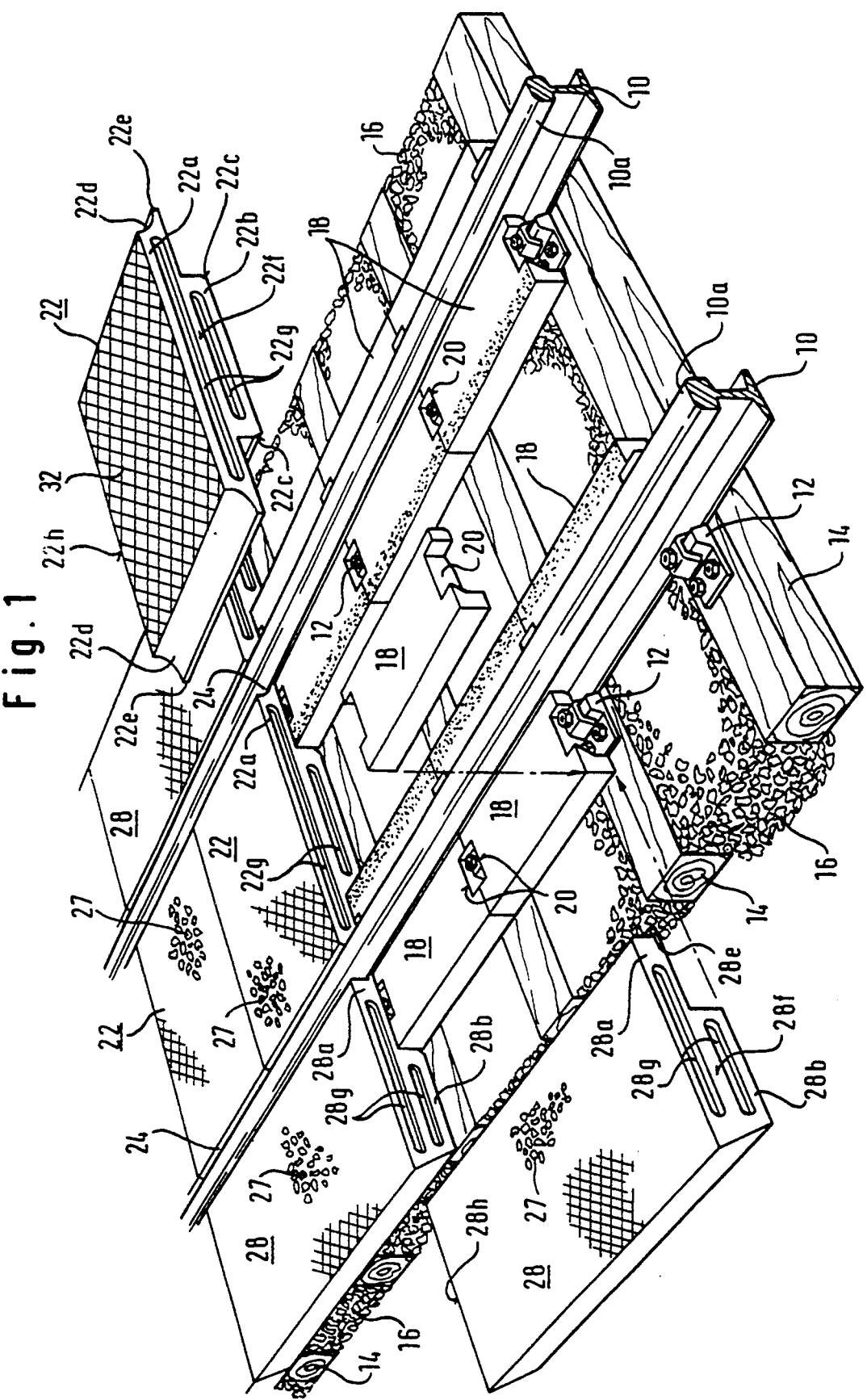
FIG. 1 is a first embodiment of the track crossing installation of the invention.

In FIG. 1, the two rails of a track system are designated by 10. These rails 10 have been placed on ties 14 by means of clip devices 12. The ties 14 are placed in a ballast bed 16 which has been compacted between two respectively successive ties by tamping. The rails 10 and the ties 14 form a track frame. The ballast material 16 is approximately flush with the top surfaces of the ties 14.

Figure 7:
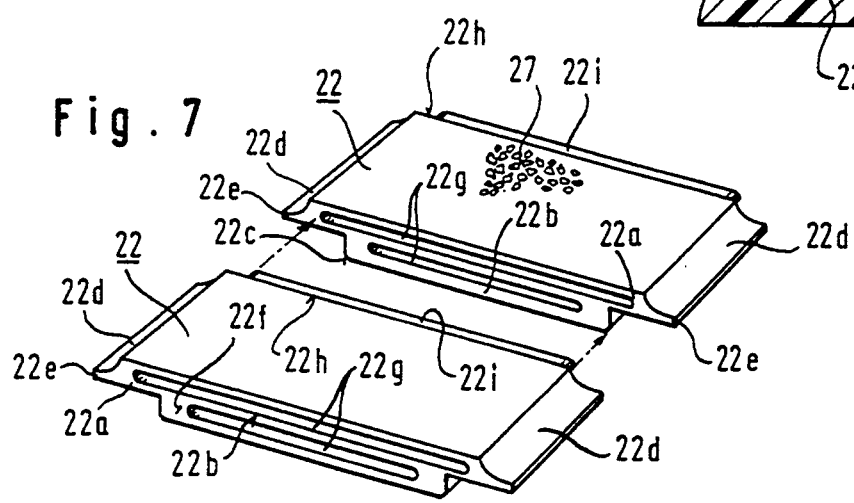
FIG. 7 is a view of the junction between center plates adjoining each other in longitudinal direction of the rails.

So-called shaped rail pieces 18 have been placed on the ties on both sides of each rail 10. These shaped rail pieces have a semi-recess 20 on both ends. The semi-recesses 20 are of such size that a clip device 12 can be placed between the two semi-recesses of two successive shaped rail pieces 18. Center plates 22 rest on the shaped rail pieces 18 between the two rails 10. These center plates have essentially a T-shaped cross section with a cross leg 22a and a center leg 22b. The center legs 22b are placed between the shaped rail pieces 18 and are beveled at 22c in such a way that they can be easily slid between the two opposite shaped rail pieces 18. The cross leg 22a is beveled or chamfered at its long edges at 22d in such a way that protrusions 22e are formed which grip the rail heads 10a from below while resting on the shaped rail pieces 18. Here, open spaces 24 are formed at least on the insides of the rails for the wheel flanges of the track wheels (not illustrated). The center plates 22 are supplied on respectively one end face 22f with grooves 22g and with complementary ribs at the opposite end face 22h, as shown in detail in FIG. 7. The ribs have been designated by 22i. The center legs 22b rest on the ballast material.

Figure 3:
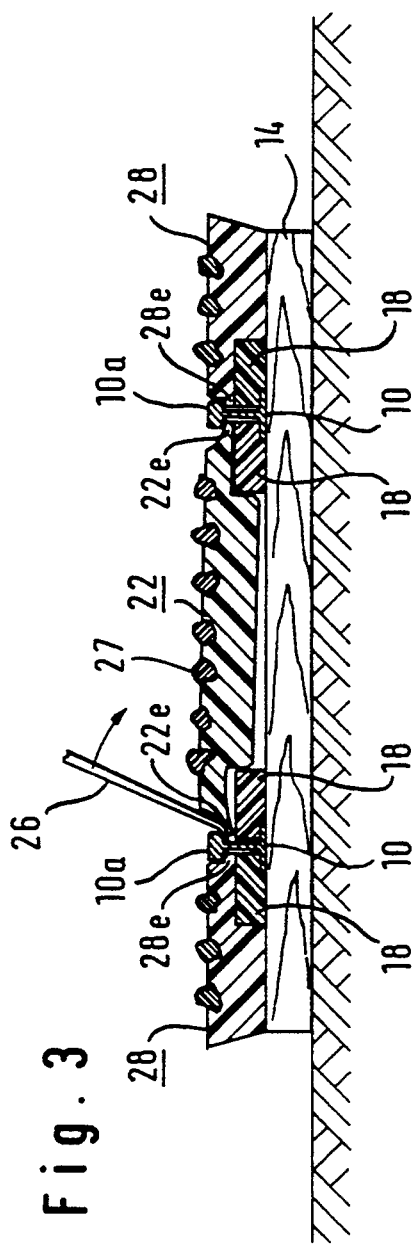
FIG. 3 is a sectional view along line III—III of FIG. 2 illustrating insertion of the center plates between two rails.

The insertion of the center plates 22 takes place in that first the protrusions 22e of the respectively one long side are inserted under the associated rail heads 10a and that then the protrusions 22e of the other long side are forced underneath the associated rail heads 10a by means of a mounting iron 26, as shown in FIG. 3. When this forcing is completed, the center plates 22 take up the position shown in FIG. 4. It is then possible to push successive center plates 22 together in the long direction of the rails, so that the ribs 22i of a center plate 22 respectively enter into the grooves 22g of the next center plate and that a practically joint-free and tight connection between successive center plates is created. The center plates then lie between the two rails essentially without being forced, but are secured by the rail heads 10a against lifting off the track frame. The underside of each center leg 22b rests on the ties 14 and the ballast material 16. Pushing together of successive center plates 22 can be performed with the aid of steel tapes, which are placed on the ties 14 underneath the center plates 22. A brace is placed on respectively one end of these steel tapes and a power tool on respectively the other end, so that when operating the power tool, the center plates are pressed against each other in the long direction of the rails 10.

Outside plates 28 are also provided, which also have protrusions 28e for gripping the rail heads 10a from below and essentially have an L-shaped form with a horizontal leg 28a intended to rest on the shaped rail pieces 18, and a vertical leg 28b intended to rest on the ties 14 and the ballast material 16. The outside plates 28 are also made with grooves 28g on respectively one end face 28f and with corresponding ribs 28i on the respectively opposite end face 28h (see FIG. 2), so that they can be pushed together in the same way as the center plates.

To make assembly easier, the tops of the shaped rail pieces 18 are made slick with soft soap prior to placing the center plates 22 and the outside plates 28 down.

Figure 4:
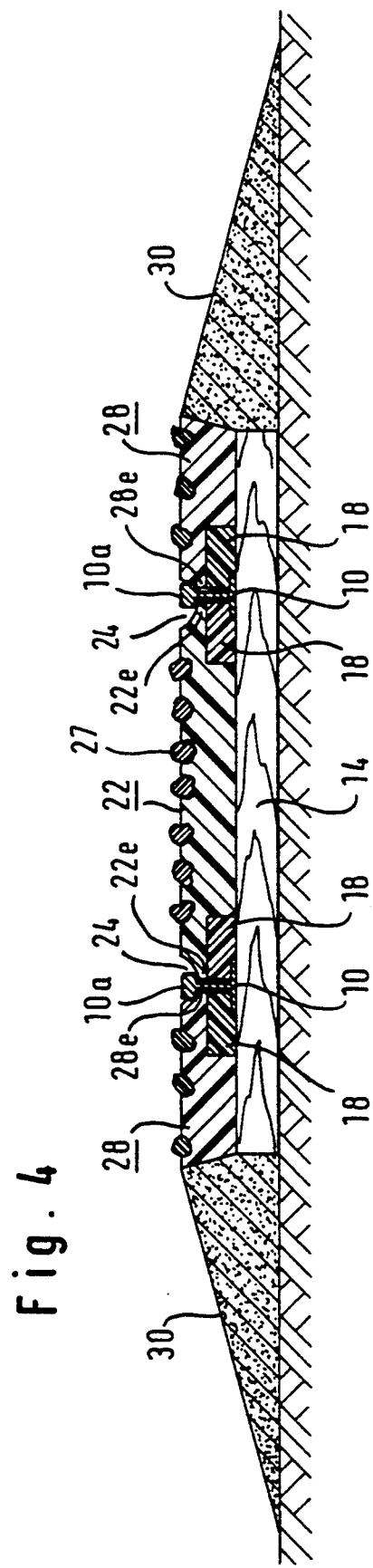
FIG. 4 is a sectional view corresponding to that one of FIG. 3 after completion of adjoining portions of a road surface.

As shown in FIG. 4, the outside plates 28 are maintained in their position by adjoining road sections 30.

Figure 5:
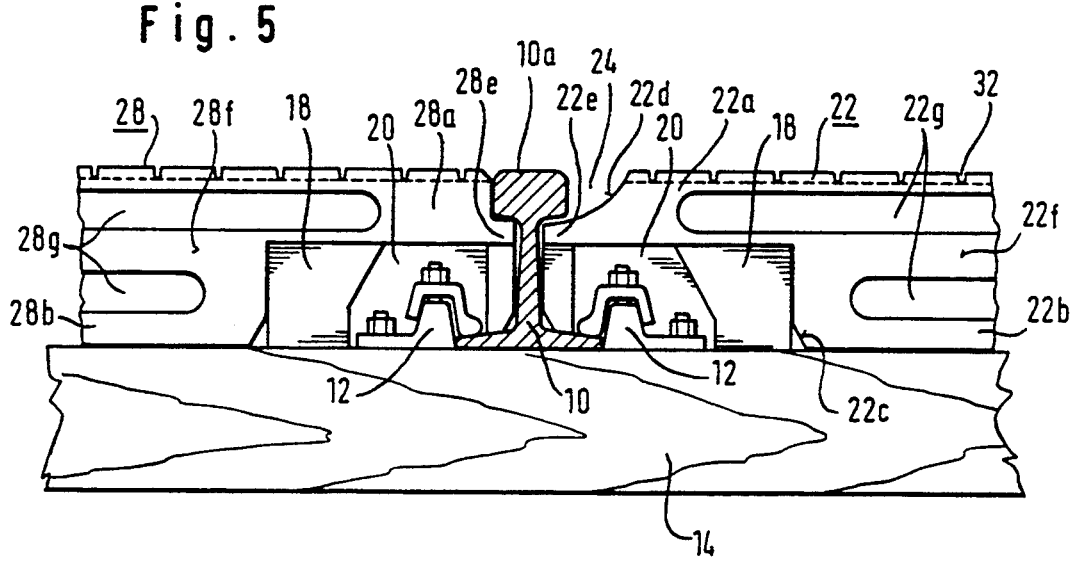
FIG. 5 is a view of the junction between plates adjoining each other in longitudinal direction of the rails.

A junction point between successive center plates 22 and outside plates 28 can be seen in FIG. 5.

FIGS. 1 and 5 show that the traveled upper surfaces of the center plates and outside plates are provided with a diamond-shaped pattern 32.

Figure 2:
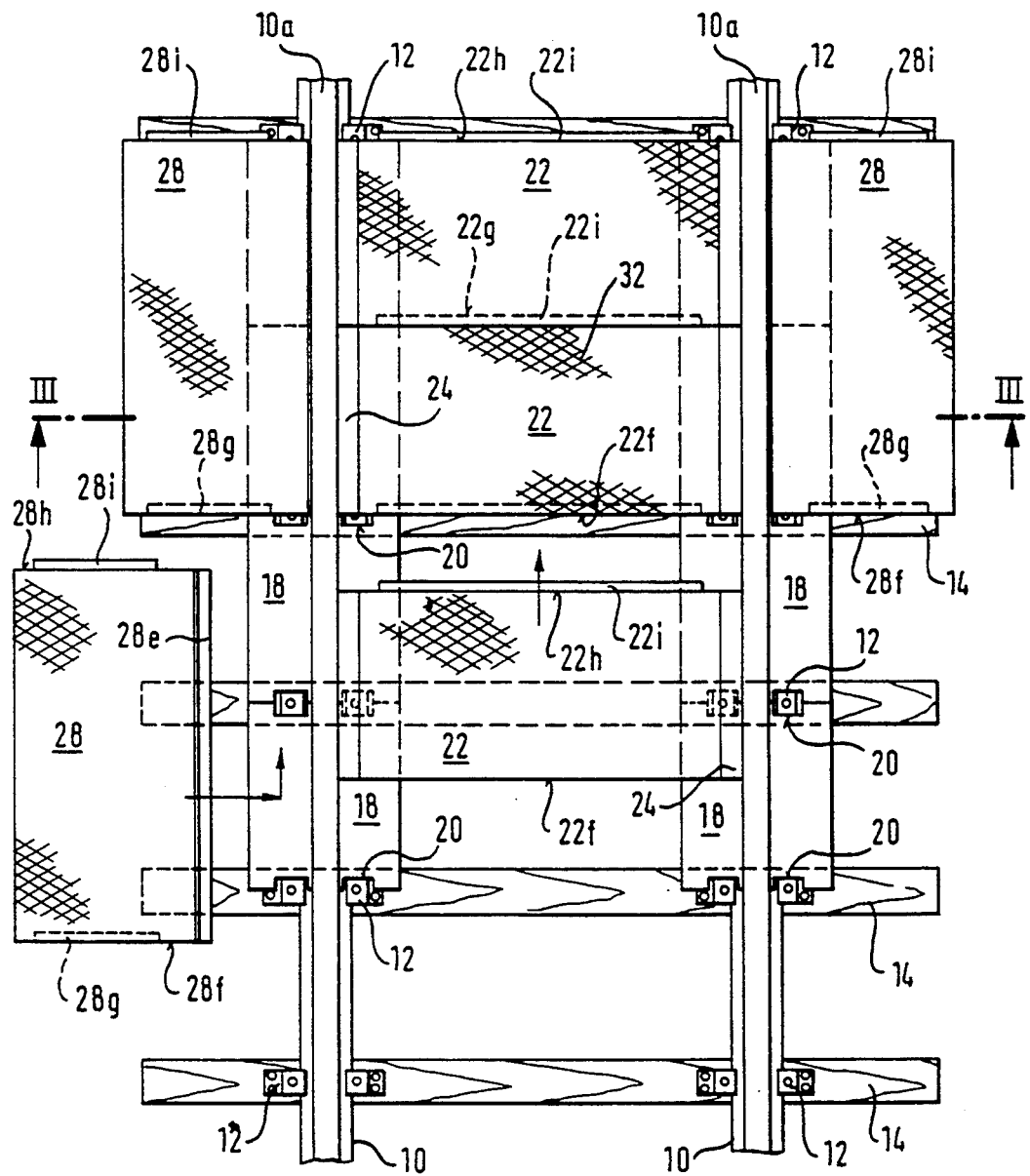
FIG. 2 is a top view of FIG. 1.
Figure 6:
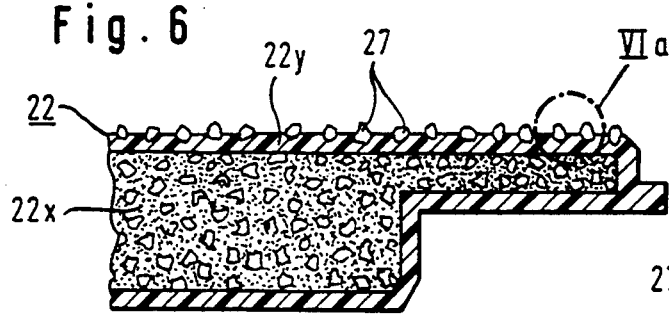
FIG. 6 is a sectional view of a plate with a covering skin.

A cross section through a center plate 22 can be seen in FIG. 6, which was made approximately along the line III—III of FIG. 2. This center plate consists of a core area 22x and a covering skin 22y. Here, the core area 22x is made of a particle-shaped rubber waste material, the particles being bonded to each other by means of a vulcanized caoutchouc material. The covering skin 22y also consists of a vulcanized caoutchouc material. The covering skin 22y is vulcanized together with the core area 22x.

It can be seen in FIG. 1 that hard material particles 27 are embedded in the traffic-carrying areas of the outside plates 28 and center plates 22. For the sake of an improved representation, in the drawing these hard material particles are only distributed over small areas, in actuality these hard material particles are respectively distributed over the entire traffic-carrying surface.

The hard material particles 27 are also visible in FIGS. 3 and 4, but on a distorted scale. The hard material particles 27 are much smaller in actuality. The size of the hard material particles will be addressed later.

It can be seen in FIG. 6 that the hard material particles 27 are exclusively contained in the traffic-carrying covering skin 22y. An enlarged view of the traffic-carrying covering skin 22y is visible in FIG. 6a, as well as an enlarged view of the hard material particles 27. These hard material particles 27 are provided with a bonding agent layer 27a, which improves the adhesion of the hard material particles 27 to the covering skin 22y. The hard material particles 27 can also be seen in FIG. 7.

Production of a center plate, such as is shown in FIG. 6, can take place in about the manner described below by means of FIGS. 10 and 11.

Particle-shaped waste rubber material, which was obtained by comminuting tire casing waste and which has a size range where the largest particles have a maximum linear extent of approximately 7 mm, is fed by means of a charging device 40 into a mixer 38, for example a screw mixer, equipped with a heating device 36. Caoutchouc which can be vulcanized is simultaneously introduced, for example in granular form, into the mixer 38 by means of a further charging device 42. Vulcanizing means, such as sulfur, and processing aids have already been added to the caoutchouc material. Alternatively it is also possible to supply the vulcanization aids and processing aids to the mixer separately. The mixture contained in the mixer has a temperature which is already sufficient to effect vulcanization later under appropriate pressure. This hot mixture is continuously fed into an insulated container 44, which can be equipped with a heating device 46. The temperature of the mixture in the insulated container is maintained or even increased, if necessary. As soon as an amount of mixed materials is contained in the insulated container which is sufficient for one of the center plates to be produced, the contents of the insulated container are transferred to a mold 48, for example by tilting the insulated container 44.

The mold 48 is shown in detail in FIG. 11; it consists of a lower mold 48a and an upper mold 48b. Prior to introducing the mixture 50, the lower mold 48 is coated with a layer 52 of caoutchouc which can be vulcanized. This caoutchouc which can be vulcanized already contains the required vulcanization aids and processing aids; for example, the layer material has a plasticine-like consistency, so that it can be easily placed on the inner walls of the lower mold 48a. Then the mixture 50 is poured from the insulated container 44 into the depression formed by the layer material 52. After this, another layer 54 of caoutchouc which can be vulcanized is spread over the mixture 50. The layer 54 is tightly adjoined to the layer 52, if necessary by overlapping in the way that the upper edges of the layer 52 are folded over the layer 54.

Figure 6A:
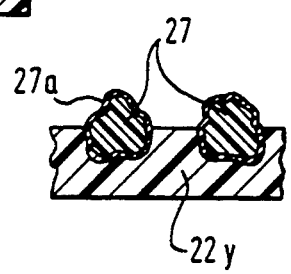
FIG. 6a is an enlargement at VIa of FIG. 6.

Subsequently a distributor 55 having a mesh bottom 55a is placed on the lower mold 48a. Hard material particles 27 are placed into this distributor. The hard material particles are supplied from a mixing container 59 via a feed line 59a. The mixing container 59 has two feed lines 59b and 59c. The hard material particles 27 are introduced into the mixing container 59 via the feed line 59b. A bonding agent in liquid form is supplied via the feed line 59c. A stirrer 59d is contained in the mixing container 59, which mixes the hard material particles with the bonding agent so that a bonding agent layer 27a is formed on the surface of the hard material particles, as shown in FIG. 6a. Via the feed line 59a the hard material particles, the surface of which is coated with the bonding agent, then reach the distributor 55 which is shaken in the direction of the arrow 55b in such a way that the hard material particles 27 fall through the screen bottom 55a on the layer 54. On the way from the mixing container 59 to the distributor 55, the bonding agent coating 27a of the hard material particles 27 can be sufficiently cured so that it no longer adheres to the distributor 55 and to the mesh bottom 55a, but still has sufficient adhesiveness to the plasticine-like layer 54. In this way a layer 27d of hard material particles is formed on the layer 54.

Then an infrared radiator 61 is brought above the lower mold 48a, which heats the layer 27d and the layer 54 sufficiently to aid increased adhesion of the hard material particles 27 to the layer 54.

A pressure roller 63 is brought above the lower mold 48a at a further station. This roller presses the layer 27d of hard material particles 27 partially into the layer 54. In the course of this, a majority of the hard material particles 27 is bonded into the layer 54. However, a residue remains essentially loose on top of the bonded particles 27. To recover this residue and to avoid spreading it and soiling the environment, a sweeping roller 65 is brought above the lower mold 48a at a further station, which rolls over the layer 27d in the direction of the arrow 65a and sweeps off the loose or only slightly adhering hard material particles and conducts them in a particle stream 65b to a catch reservoir, not shown.

Then the upper mold 48b is pressed against the lower mold 48a. The lower mold 48a is equipped with a heating device 56. A further heating device 58 is provided in the upper mold 48b. Not only the caoutchouc portion of the mixture 50, but also the caoutchouc in the layers 52 and 54 is vulcanized in the mold 48. For this purpose the heat, which had been brought into the lower mold 48a with the mixture, is available for vulcanizing the mixture 50, while vulcanizing heat for the layers 52 and 54 is transmitted from the heating devices 56 and 58 through the walls defining the mold chamber. By vulcanizing the mixture 50, a matrix of vulcanized caoutchouc is created, in which the particles of the already previously vulcanized waste rubber material are enclosed singly or in groups. The layers 52 and 54 are also vulcanized and as a result of vulcanization form a firmly adhering material connection with the mixture. In this way the core area 22x in accordance with FIG. 6 is created from the mixture 50 and the covering skin 22y of FIG. 6 from the caoutchouc layers 52 and 54.

In the course of vulcanization, the hard material particles 27 are vulcanized into the layer 54, and bonding agent layers 27a can also be cured—to the extent that this has not yet taken place—and can enter into an intimate chemical or physical bond not only with the hard material particles 27, but also with the layer 54.

Following the termination of the vulcanization process, the molded body can be taken from the mold 48 and cooled. Then it is ready to use.

Figure 8:
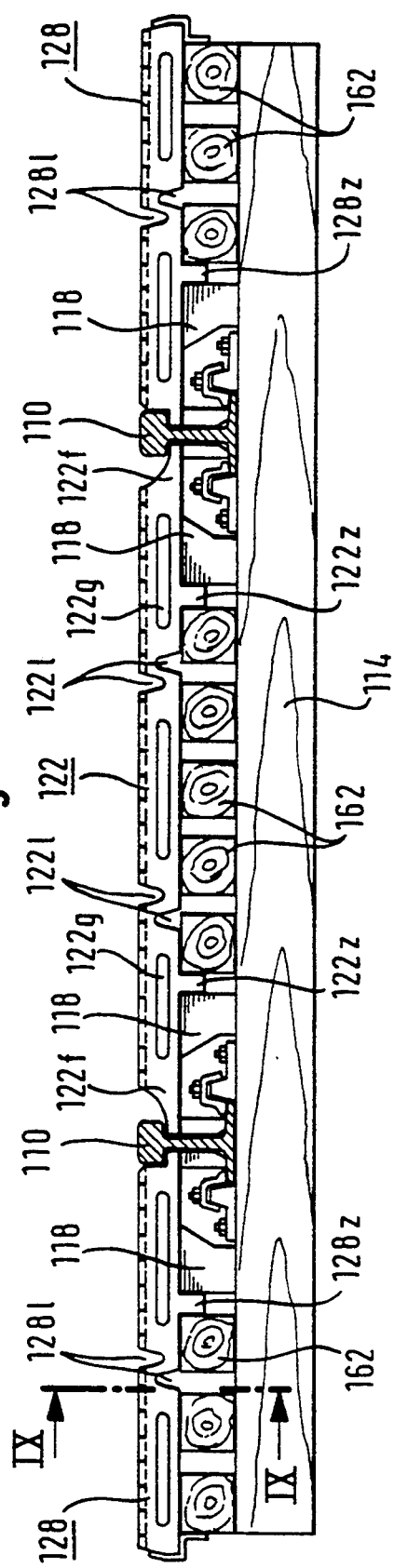
FIG. 8 is a sectional view of a second embodiment of a track crossing installation.
Figure 9:
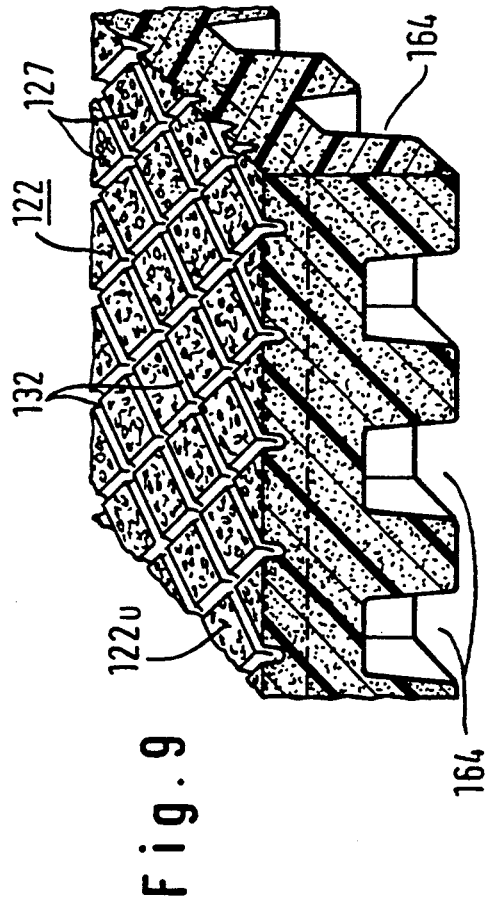
FIG. 9 is a sectional view along the line IX—IX of FIG. 8.

A further embodiment of a track crossing installation is illustrated in FIGS. 8 and 9. In this embodiment the center plates 122 are made with lesser plate thickness than in the embodiment in accordance with FIGS. 1 to 7. The center plates 122 rest on elongated wood pieces 162 which, in turn, have been placed on ties 114. The outside plates 128 also rest on elongated wood pieces 162. The traffic-carrying surfaces of the center plates 122 are provided with a diamond-shaped pattern 132.

Here, too, the end faces 122f are provided with grooves 122g, to which correspond ribs on the respectively opposite end faces, not shown. The engagement of the center plates 122 and the outside plates 128 with the rails 110 is the same as in FIG. 1. Here, too, shaped rail pieces 118 are present in the area of the rails, which are designed similarly or identically with those in FIG. 1. The center plates 122 and the outside plates 128 are made with centering bars 122z or 128z, which rest against the shaped rail pieces 118. The center plates 122 and the outside plates 128 are provided with longitudinal grooves 122l or 128l, which provide relief in case of heat expansion and furthermore make the installation of the center plates 122 in accordance with the method of FIG. 3 easier. It is possible to provide recesses 164 in the underside of the plates 122 as well as the outside plates 128, which result in a reduction of weight.

The embodiment in accordance with FIGS. 8 and 9 is more advantageous in respect to production costs than the embodiment in accordance with FIGS. 1 to 7, because the plates 122 and 128 require less material. The amount of material for the elongated wood pieces 162 is less in this case than the amount of material required for the thicker plates. The embodiment in accordance with FIGS. 8 and 9 is intended particularly for track crossings which are only used by pedestrians or light vehicles.

The recesses 164 in accordance with FIG. 9 can also be used with the plates in accordance with FIGS. 1 to 7.

The plates 122 and 128 in accordance with FIGS. 8 and 9 consist of a particle-shaped waste rubber material of a size range where the largest particles have a maximum linear extent of approximately 1 to 2 mm. These particles are bonded into a thermoplastic binder material. A covering skin is not required here. The small size of the particles here assures that essentially closed surfaces are achieved, in which waste rubber particles which extend a little above the surface improve the surface structure in the sense of enhanced non-slip.

It can be seen in FIG. 9 that hard material particles 127 are embedded in the traffic-carrying surface 122u. For this reason it is perhaps possible to omit the profiling shown in FIG. 9 and to leave the adhesion with the tires of a vehicle travelling on the traffic-carrying surface only to the hard material particles 127.

The plates 128 can be embodied the same way as the plates 122 of FIG. 9. Manufacture of the plates 122 and 128 takes place as schematically illustrated in FIG. 12.

Figure 12:
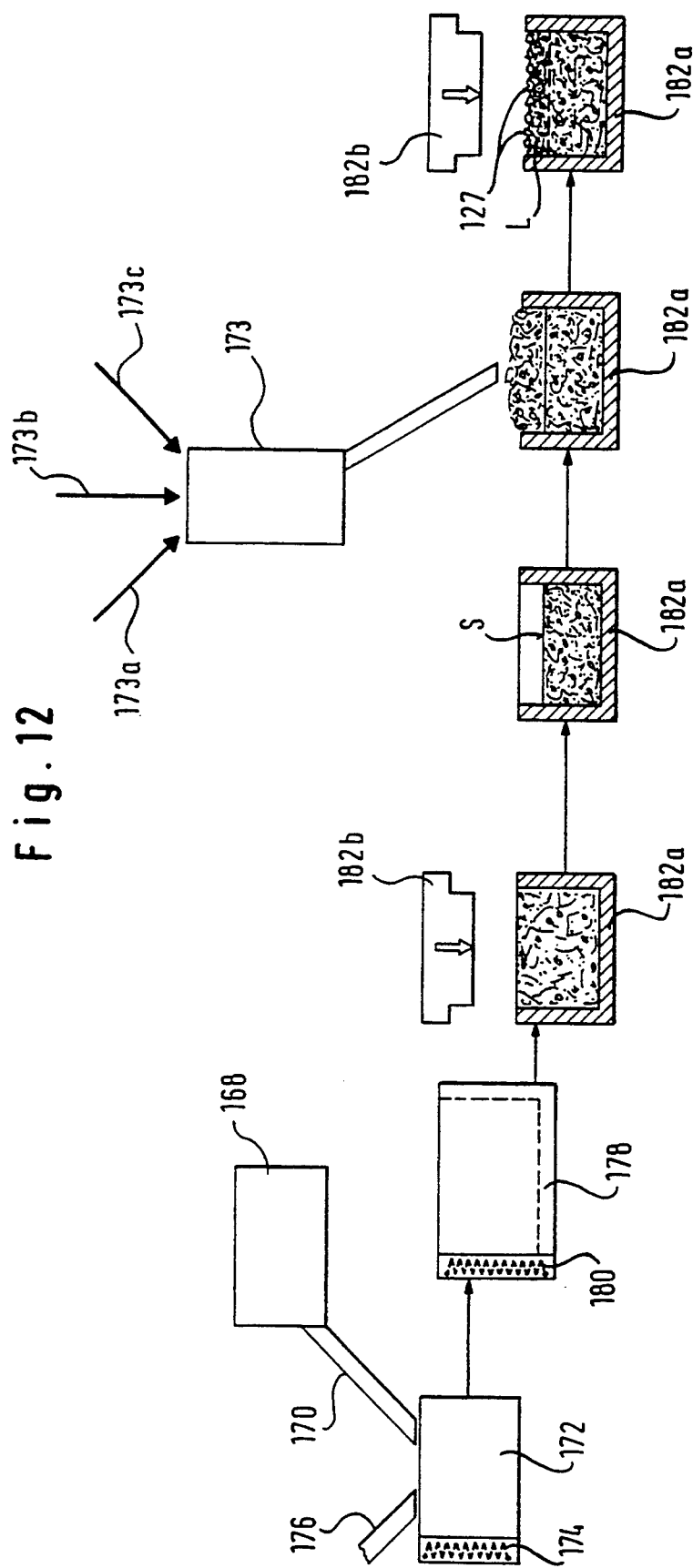
FIG. 12 shows an installation for producing molded bodies with a thermoplastic binder material and without covering skin.

A chopping device is indicated by 168 in FIG. 12, where thermoplastic waste films are processed into chopped material under the effect of heat. The chopped film particles have a greatest linear extent of approximately 15 mm. The chopped material is heated by the mechanical energy of the chopping process. Through a feed line 170, the heated chopped material reaches a screw mixer 172, which can also be equipped with a heating device 174. Particle-shaped, vulcanized waste rubber material reaches the screw mixer 172 through a further feed line 176. The particle size range of the vulcanized waste rubber is such that the largest occurring particles have a linear extent of approximately 1 to 2 mm. The mixing ratio of thermoplastic waste film and vulcanized waste rubber particles is approximately 50: 50 parts by weight. The thermoplastic waste film material consists for example of polyethylene. A temperature is attained in the screw mixer 172 which lies above the thermal plastification point of the respective thermoplastic material. From the screw mixer 172, the mixed material reaches an insulated container 178 which, in turn, can be equipped with a heating device 180. Once sufficient mixed material is contained in the insulated container 178 for filling a mold for producing a center plate 122, for example, the mixed material is poured into a lower mold 182a and is then pre-pressed by an upper mold 182b.

Accordingly, the level S of the mixed material in the lower mold 182a falls below the upper mold edge of the lower mold 182a. It is now possible to introduce additional mixed material from a further screw mixer 173, if necessary with the interposition of a further storage container, into the lower mold 182a, until the lower mold 182a is again almost completely filled. The mixed material processed in the further screw mixer 173 preferably consists of the same basic ingredients as the mixed material which was processed in the screw mixer 172, in particular of polyethylene and comminuted waste rubber material in the above mentioned mixing ratio and with the above mentioned particle size of the waste rubber material. However, now hard material is supplied to the screw mixer 173, in addition to the chopped polyethylene and the waste rubber material, which also can have been previously provided with a bonding agent layer. One feed line 173a is used for supplying chopped polyethylene, the feed line 173b is used for supplying the waste rubber material and the feed line 173c is used for supplying the hard material particles. These three components are processed into a mixture in the screw mixer 173, which is then poured into the lower mold 182a. When the mixed material already contained in the lower mold meets the additional mixed material being poured from the screw mixer 173, both batches are still in a state so that they intimately mix during subsequent pressing.

During fill-in of the mixed material, the mold 182a has a temperature which lies slightly below the softening point of the thermoplastic foil material. By pressing the mixed material, which at first is still heated above the thermoplastic softening point, a matrix of thermoplastic material is formed in which the particles of the vulcanized waste rubber material are embedded singly or in groups. The temperature of the mold 182a, 182b slightly below the softening point, prevents shock cooling. Subsequently, slow cooling takes place in the mold 182a, 182b. As soon as cooling of the mixed material has proceeded far enough so that a molded body has been formed, the latter is taken out of the mold and is further cooled. The cooled molded body is ready for use in a track crossing installation.

The method in accordance with FIG. 12 is particularly suited for the production of the center and outside plates 122 and 128 of FIG. 8.

However, it is also possible in principle to produce the center plates 22 and the outside plates 28 of FIG. 1 by means of the method according to FIG. 12; the center plates 22 and the outside plates 28 of FIG. 1 are preferably produced in accordance with the method of FIGS. 10 and 11. On the other hand, it is also possible to produce the center plates 22 and the outside plates 28 of FIG. 1 in accordance with the method of FIG. 12.

For producing the shaped rail pieces 18 of FIG. 1, one may also employ the method in accordance with FIG. 12; in such case, the step of admixing the hard material particles 127 can be left out. Then, two-step feeding of the lower mold 182a can be replaced by one-step feeding.

In the molded body produced in accordance with FIG. 12, the hard material 127 is embedded in the upper layer L, the layer thickness of the layer is such that in the course of actual use there is hard material in the area of the respectively traffic-carrying surface as long as the molded body is usable at all. Because of the manufacturing process, the bonding of the hard material is especially intimate with this embodiment. However, a bonding agent can also be used here, which has on the one hand good adhesion on the respective hard material and on the other hand good adhesion on the thermoplastic binder.

In both embodiments, the hard material can consist of corundum particles and/or metal carbide particles and/or metallic nitride particles and/or metallic oxide particles.

A preferred hard material is corundum.

To the extent that a bonding agent is used, it depends on the one hand on the material consistency of the hard material particles and on the other hand on the material consistency of the bonding material. Conventional solvent-based adhesives are often suitable; in the case of a combination of corundum hard material particles and vulcanized caoutchouc, an adhesive primer, such as the product Chemosil 211 of the firm Henkel KG a.A. in accordance with the pamphlet of the firm Henkel KG a.A. KHM 6/87, is preferably used as bonding agent. A binder of the type of the product Chemosil 220, also by the firm Henkel KG a.A. and described in the pamphlet KHM 6/87 is also suitable.

In each case it is necessary to see to it that the consistency of the bonding agent is such that it cures sufficiently fast so that gumming up of the application and conveying devices is prevented, but that it still has sufficient adhesion to the respective binders at the final unmolding of the traffic-carrying surface.

Figure 13:
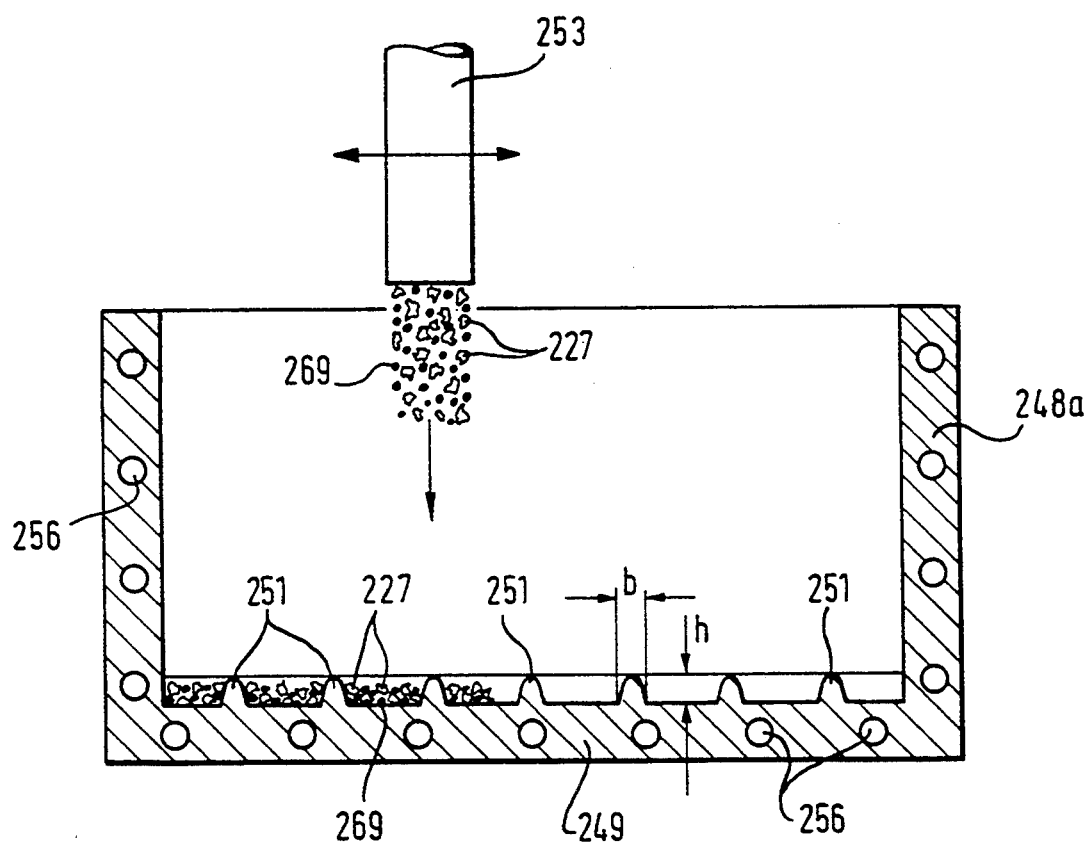
FIGS. 13 to 16 show the working process of a further installation for producing molded bodies.

In FIG. 13 and in the following Figures, similar parts are designated by the reference numerals of FIGS. 10 and 11, but increased by 200. A lower mold 248a can be seen in FIG. 13; this lower mold is similar in construction to the lower mold 48a of FIG. 10 and may also be provided with a heat exchanger 256. This lower mold 248a is provided at its bottom surface 249 with raised ribs 251. The ribs are crossing each other so as to define a rhombus pattern. This rhombus pattern is almost complementary to the rhombus pattern shown in FIG. 9 at 132 at the driving surface of the molded body shown.

When seen in a cross-sectional view orthogonally to the longitidinal extent of the ribs, these ribs have e.g. a width b of 6 mm and a height h of also 6 mm. As can be seen from FIG. 17, the long diagonals d1 have a length of from approximately 30 mm to approximately 50 mm, preferably approximately 45 mm, and the short diagonals d2 have a length of from approximately 15 mm to approximately 25 mm, preferably approximately 20 mm. These dimensions serve only to give an idea of the dimensions, but these dimensions may be varied within broad ranges.

The production process is as follows: Hard material particles which may be coated on their surface with a bonding agent, e.g. with the above-mentioned solvent-based adhesives of the firm Henkel, are sprayed into the heated mold bottom 249 by means of a feeder 253.

The bonding agent is partially cured. The thus coated hard material particles 227 are evenly distributed across the bottom surface 249 by movements of the feeder 253. The hard material particles 227 get on account of the rib pattern preferably into the surface areas between the ribs 251. It is to be noted that according to FIG. 13 the ribs 251 are upwardly convexly rounded in their cross-section. This favours the concentration of the hard material particles to the rhombic bottom surface areas limited by the ribs 251. The concentration to the rhombic bottom areas between the ribs can still be favoured by a shaking motion of the lower mold 248a. The particle size of the hard material particles, measured after application of the bonding agent, is between approximately 1 mm and approximately 3 mm, the respective measurements relating to the longest linear extent. The hard material particles 227 are sprinkled onto the bottom 249 in such quantities that the upper boundary line of the layer is below the apices of the ribs 251.

Figure 14:
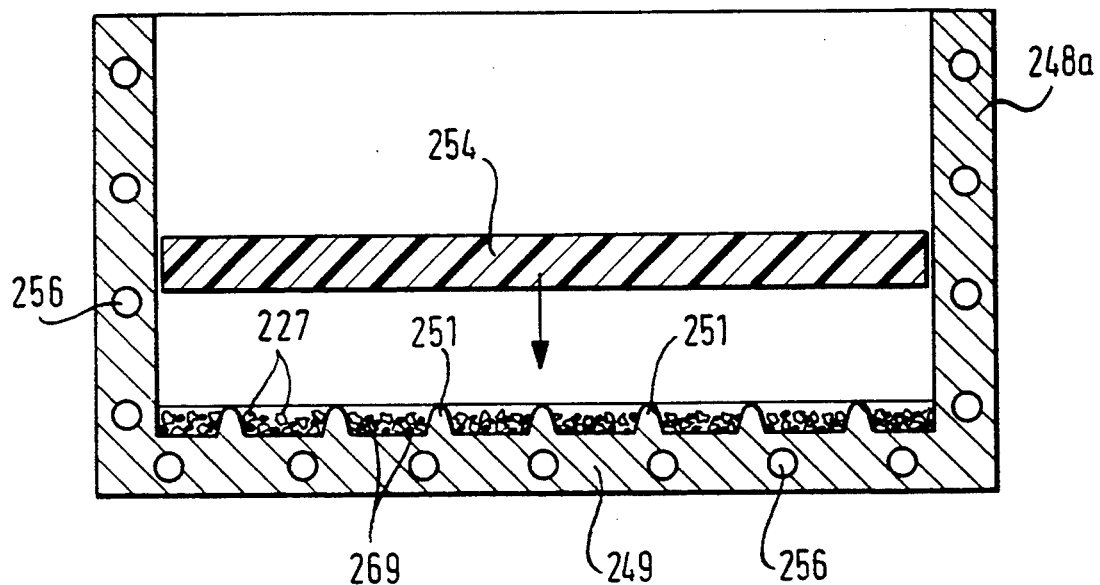

According to FIG. 14, a vulcanizable premolded raw rubber cover layer 254 is applied to the bottom 249 over the ribs 251 and over the hard material particles.

Figure 15A:
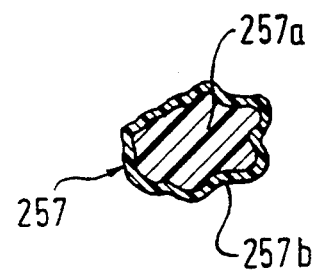
FIG. 15a shows a detail of FIG. 15.
Figure 15:
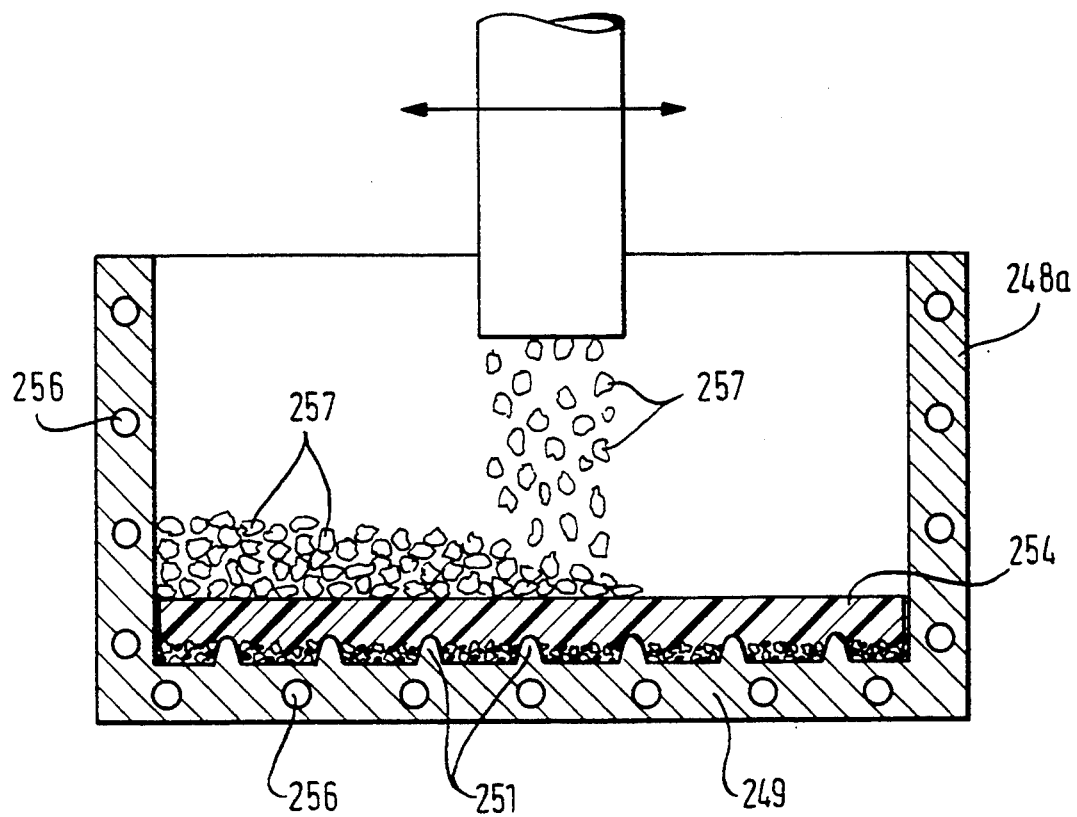

According to FIG. 15, a mixture consisting of waste rubber particles and vulcanizable raw rubber material is applied onto this raw rubber cover layer 254. This mixture is designated by 257. This mixture comes from a mixer as shown at 38 in FIG. 10. The waste rubber particles 257a are partially surrounded by the vulcanizable raw rubber 257b, as shown in FIG. 15a as a consequence of the mixing process in the mixer. The waste rubber particles have a longest linear extent of approximately 7 mm. The waste rubber particles are again preferably obtained by comminution of tires. When being poured into the lower mold 248a, the mixture 257 has preferably a temperature sufficient to cause at the successive action of pressure a vulcanization of the raw rubber material 257b. The material composition and the cross-linkage degree of the raw rubber portion 257b in the mixture 257 correspond preferably to the material composition and the cross-linkage degree of the vulcanizable raw rubber cover layer 254.

Figure 16:
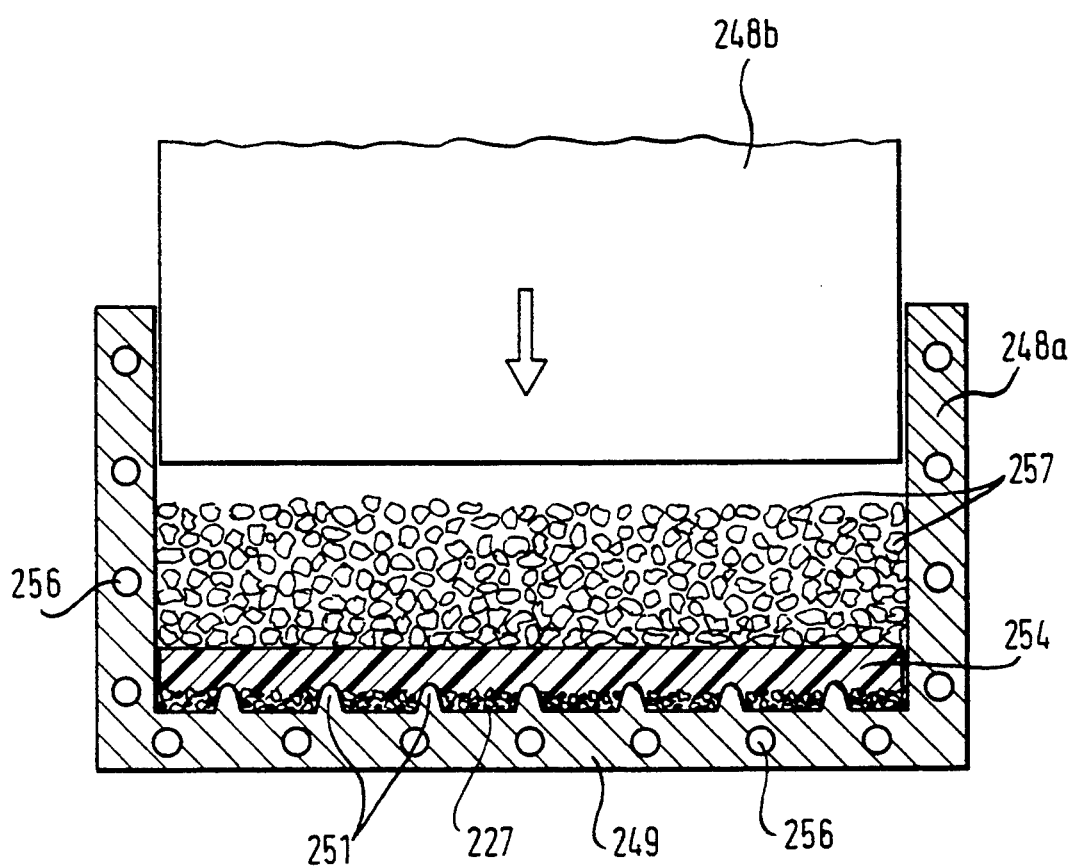

When the lower mold 248a has been filled with the mixture up to a desired level corresponding to the respectively desired plate thickness, an upper mold 248b is inserted according to FIG. 16 into the lower mold 248a and pressed against the fill of mixture 257. Through heating of the lower mold 248a and/or the upper mold 248b the temperature required for the vulcanization can be corrected. The vulcanization of the raw rubber portion 257b of the mixture 257 is effected substantially by the heat fed to the mixer during the intermixture of waste rubber particles and raw rubber; the heat required for the vulcanization of the raw rubber cover layer 254 is introduced through the upper mold 248b. Thus, a vulcanization of the raw rubber portion 257b of the mixture 257 and a vulcanization of the raw rubber cover layer 254 are caused. The raw rubber portion 257b of the mixture forms together with the waste rubber particles a matrix which encloses the waste rubber particles 257a and coalesces with the raw rubber cover layer 254 so as to form a vulcanized cover layer connected with the matrix. Through the action of pressure by means of the upper mold 248b, the rhombic pattern shown in FIG. 17 is impressed into the lower side of the raw rubber cover layer at the beginning of the vulcanization process; at the same time, the hard material particles are impressed into the raw rubber cover layer and then bonded thereto by vulcanization.

Figure 17:
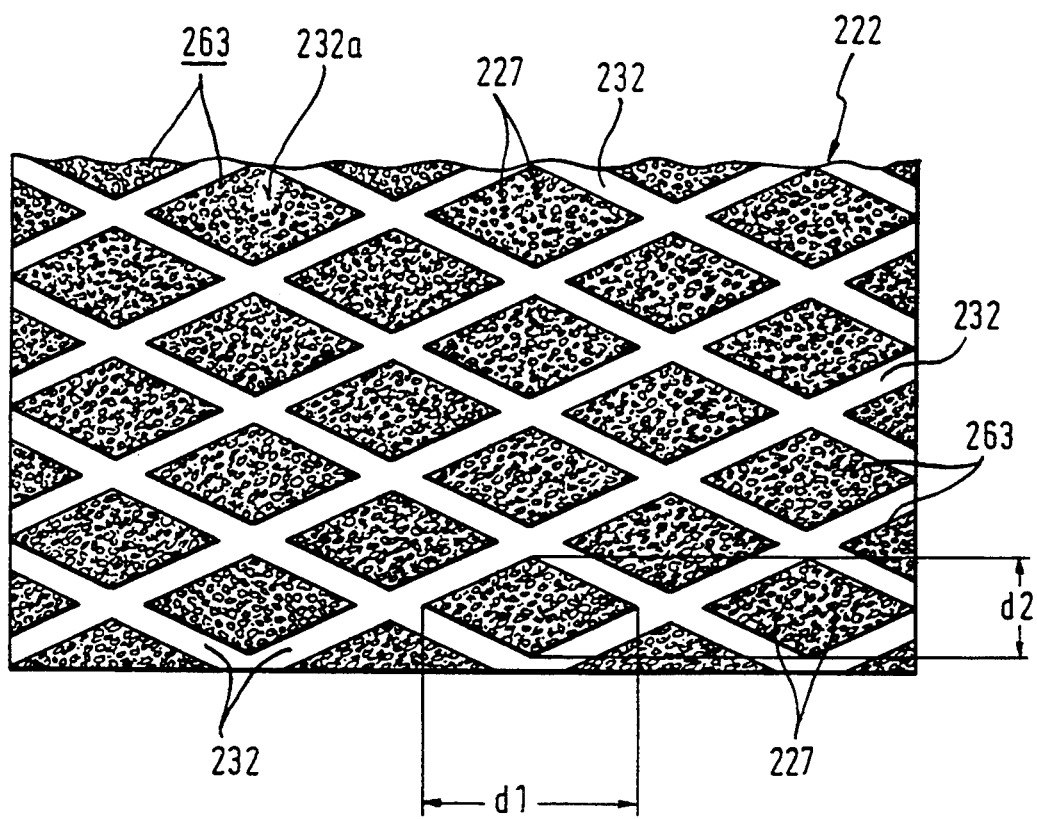
FIG. 17 shows a molded body produced according to FIGS. 13-16.

FIG. 17 shows a molded body 222 which corresponds e.g. to a center plate 22 according to FIG. 1. In FIG. 17, the upper side serving as traffic-carrying surface corresponds to that side of the raw rubber cover layer 254 which is resting on the bottom surface 249 in FIG. 13. In this upper side, one can see the grooves 232 crossing each other which have been formed by impression of the ribs 251 into the raw rubber cover layer 254.

It can be seen in FIG. 17 that the hard material particles 227 are substantially limited to the rhombic regions 263, whereas the confining areas of the grooves 232 are substantially free from hard material particles, corresponding to the above-described freeness of the ribs 251 from hard material particles. This is desirable: By the fact that the grooves 232 are kept free from hard material particles 227, the surface density of the hard material particles 227 in the rhombic regions 263 is increased with a given total amount of hard material particles 227 sprinkled on. Consequently, with a relatively small amount of hard material particles 227 one attains a great concentration of hard material particles at a place where these hard material particles are required to achieve very good non-skid properties, i.e. in the rhombic regions 263. Another advantage of keeping the grooves 232 free from hard material particles 227 is that the water flow in the grooves 232 is improved so that an accelerated discharge of water can be expected.

In the production of the center plates 222 according to the method described so far, the hard material particles partially penetrate into the raw rubber cover layer 254 being vulcanized and are partially enclosed by vulcanized raw rubber. Therefore, the hard material particles lie only partially with their tip portions in or above the traffic-carrying upper side 232a. This means that at the beginning of the use of a central plate 222 the friction of a tire moving across the center plate has not yet achieved an optimum level. After a certain period of use, the rubber layer on the traffic-carrying upper side 232a of the center plate wears out more than the hard material particles 227. The consequence thereof is that the tips of further hard material particles 227 are set free so that an optimum of friction properties is achieved at the upper side of the central plates 222. One can put up with this behaviour, i.e. one can accept that at the beginning the surface roughness of the traffic-carrying upper side 232a has not yet reached an optimum.

This is especially possible if in accordance with given climatic circumstances the installation can be carried out during a dry season and if it can be expected that by the beginning of rainy weather there has already been sufficient wear of the rubber at the upper side 232 in order to set free a sufficient quantity of hard material particles 227 whose tips and edges face the the traffic-carrying upper side 232a.

Within the frame of the present invention, it is however also possible to see to it that already at the time of installation of the molded bodies or center plates, respectively, the traffic-carrying upper side 232a exhibits sufficient roughness. For example, it is possible to subject the upper side 232a to a roughening treatment after the vulcanization process, possibly also only after a certain life or curing time.

Figure 18:
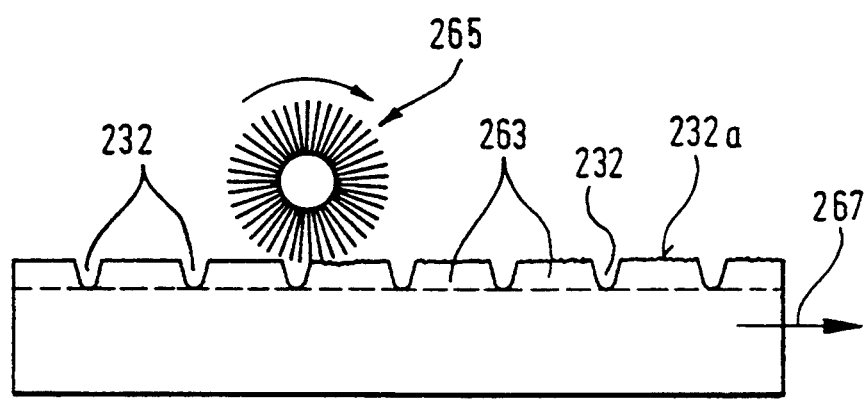
FIG. 18 is a schematic view of a roughening treatment.

A preferred possibility of carrying out this toughening treatment is shown in FIG. 18. One can see how a center plate is passed below a rotating steel wire brush roller 265 in the direction of arrow 267. By the action of the steel wire tips of the steel wire brush roller 265 onto the upper side 232a, a roughening is achieved with an increased abrasion of rubber in the rhombic regions 263, so that more and more hard material particles 227 are set free at their tip zones without loss of adhesion in the vulcanized cover layer. Especially owing to the aforementioned bonding agent, adhesion between the hard material particles 227 and the vulcanized cover layer 254 remains existent.

In order to contribute to a roughening of the traffic-carrying upper side by the steel wire brush roller 265 with minimum loss of hard material particles from the traffic-carrying upper side, one can additionally provide the following measures: According to FIG. 13, roughening agents 269 may be poured in together with the hard material particles 227 which are preferably but not necessarily coated with a bonding agent. These toughening agents may be of mineralic nature; but they should be softer and consequently better abradible by the action of the steel wire brush roller than the hard material particles 227 and better abradible than the vulcanized rubber material of the vulcanized rubber cover layer 254.

In this connection, one should take special care that the roughening agent is less adhesive with respect to the bonding agent of the hard material particles 227 and with respect to the vulcanized rubber material of the rubber cover layer 254 than the hard material particles 227 are with respect to the rubber material. The roughening agent may consist e.g. of specific polymers which exhibit relatively poor adhesive properties with respect to the bonding agent coating of the hard material particles and with respect to the rubber material of the rubber cover layer 254. Consequently, during the roughening treatment according to FIG. 18, the roughening agent is abraded by the steel wire brush roller 265 to an increased extent without adversely affecting adhesion of the hard material particles coated with the bonding agent to the vulcanized rubber cover layer 254 and without complete exposition of hard material particles caused by abrasion of rubber material. This can be understood as follows: Tips and edges, however, of the hard material particles 227 are bared by abrasion of the roughening agent by removing individual particles of the roughening agent.

It has shown that owing to the use of toughening agents the loss of hard material particles 227 during the toughening treatment according to FIG. 18 is smaller than in case of a roughening treatment without toughening agents, that the evenness of the exposure of tips is improved by the roughening treatment, and that the consumption of energy and brushes is reduced by the use of the roughening agents for the roughening treatment according to FIG. 18.

The term "curable mold material" used hereinbefore means in principle that for molding the mold material can be brought to a liquid or viscous state and can be cured after molding. Besides mold materials which can be cured by chemical reaction, especially curable thermoplastic mold materials are used which can be rendered moldable by heating and which can be cured by subsequent cooling. Furthermore, also vulcanizable rubber-based mold materials can be considered as curable mold materials. Concerning the afore-mentioned binders, the same comments apply that have been made with respect to the mold materials.

As to further details about the production of track crossing installations, the molded bodies used therefor and the mold materials used for the production of molded bodies, reference should be had to German Patent Document DE-.OS 11 599 A1 already mentioned hereinbefore.

The foregoing specification and the drawing are intended as illustrative and are not to be taken as limiting. Still other variations and modifications are possible without departing from the spirit and scope of this invention.

What is claimed is:

1. A method for producing a molded body of a track crossing installation, the molded body having a traffic-carrying surface layer containing hard particles and a body layer underlying the surface layer and substantially free of the hard particles, comprising the following steps: a first curable mold material is prepared for the body layer; a second curable mold material is prepared for the surface layer; the hard particles are added to and mixed with the second curable mold material; predetermined quantities of the first curable mold material and the mixture of the second curable mold material and the hard particles are introduced into a mold in mutually adjacent layered relationship to form a precursor of the molded body; pressure is exerted on the precursor in a direction transverse to the layers; and the precursor is then cured.

2. The method of claim 1, characterized in that a filler material is added to and mixed with the first curable mold material.

3. The method of claim 2, characterized in that the filler material is particulate waste rubber.

4. The method of claim 1, characterized in that the first and second curable mold materials contain vulcanizable raw rubber.

5. The method of claim 1, characterized in that the mold has an upwardly facing opening, the precursor is layered in the mold with the body layer underlying the surface layer, and pressure is applied to the precursor by introducing a mold top into the opening of the mold.

6. A method for producing a molded body of a track crossing installation, said molded body having a traffic-carrying surface and containing hard material particles bonded to a layer adjoining the traffic-carrying surface, said method comprising the following steps: a curable mold material is molded to form the molded body with said layer close to the traffic-carrying surface of the molded body, the traffic-carrying surface is then sprinkled with said hard material particles, and said layer is then allowed to cure.

7. The method of claim 6, characterized in that said hard material particles having been sprinkled onto a layer close to the traffic-carrying surface are pressed into this layer, and that this layer is then allowed to cure.

8. The method of claim 7, characterized in that after said sprinkling of said hard material particles into said layer close to said traffic-carrying surface a portion of said sprinkled-on particles are swept off.

9. The method of claim 7, characterized in that after said sprinkling and after said impressing of said hard material particles into said layer close to said traffic-carrying surface a portion of said sprinkled-on particles are swept off.

10. The method of claim 6, characterized in that a molded body core region consisting of particulate waste rubber material and a vulcanizable raw rubber mixture is coated with a layer of vulcanizable raw rubber so that the layer of vulcanizable raw rubber forms the traffic-carrying surface, that the traffic-carrying surface is then sprinkled with the hard material particles, and that said mixture of vulcanized raw rubber is vulcanized in said core region and in the layer close to said traffic-carrying surface.

11. The method of claim 6, characterized in that a molded body core region consisting of particulate waste rubber material and a vulcanizable raw rubber mixture is coated with a layer of vulcanizable raw rubber so that the layer of vulcanizable raw rubber forms the traffic-carrying surface, that the traffic-carrying surface is then sprinkled with the hard material particles which are then pressed into said traffic-carrying surface, and that said mixture of vulcanized raw rubber is vulcanized in said core region and in the layer close to said traffic-carrying surface.

12. The method of claim 1 or 6, characterized in that said hard material particles are coated with an organic curable bonding agent, and that said hard material particles are then incorporated into the curable mold material at a state at which the bonding agent is still capable of being bonded into the curable mold material.

13. A method for producing a molded body of a track crossing installation, said molded body having a traffic-carrying surface and containing hard material particles bonded to at least a layer adjoining the traffic-carrying surface, said method comprising the following steps: a lower mold is used which has a vertically upwardly directed bottom surface with upwardly directed projections, hard material particles are sprinkled onto this bottom surface such that these hard material particles accumulate substantially between said projections on said bottom surface, and a curable mold material is poured into said lower mold and cured.

14. The method of claim 13, characterized in that said lower mold is subjected to a shaking motion so that said hard material particles accumulate primarily in depressions defined and bounded by said projections.

15. The method of claim 13, characterized in that first a curable mold material layer is applied onto the bottom surface of said lower mold over the sprinkled-on hard material particles and a mixture of a curable mold material and particulate filler material is applied onto said curable mold material layer, and that the curable mold material of the mixture is simultaneously cured with the curable mold material of said curable mold material layer.

16. The method of claim 13, characterized in that said curable mold material within said lower mold is subjected to pressure by inserting an upper mold into said lower mold.

17. The method of claim 15, characterized in that said curable mold material is vulcanizable raw rubber.

18. The method of claim 15, characterized in that said curable mold material is a thermoplastic curable mold material.

19. The method of claim 15, characterized in that said curable mold material is a polyolefin-based thermoplastic material.

20. The method of claim 15, characterized in that said particulate filler material is particulate vulcanized waste rubber.

21. The method of claim 13, characterized in that said hard material particles are coated with a bonding agent prior to being poured into said lower mold.

22. The method of claim 1 or 6 or 13, characterized in that said traffic-carrying surface of said molded body is subjected to a roughening treatment after the curing of said curable mold material.

23. The method of claim 22, characterized in that said roughening treatment is carried out by means of at least one metal wire brush.

24. The method of claim 22, characterized in that said roughening treatment is carried out by means of at least one rotating metal wire brush.

25. The method of claim 1 or 6 or 13, characterized in that prior to the curing of said traffic-carrying surface of said molded body a roughening agent is incorporated into this surface, which roughening agent is less adhesive with respect to said hard material particles and to said curable mold material than said hard material particles with respect to said curable mold material.

26. The method of claim 22, characterized in that prior to the curing of said traffic-carrying surface of said molded body a roughening agent is incorporated into this surface, which roughening agent is less adhesive with respect to said hard material particles and to said curable mold material than said hard material particles with respect to said curable mold material.

27. The method of claim 25, characterized in that said roughening agent is sprinkled onto the bottom surface of a lower mold, onto which bottom surface also said hard material particles are sprinkled simultaneously with or after said roughening agent and prior to the insertion of said curable mold material into said lower mold.

28. The method of claim 26, characterized in that said roughening agent is sprinkled onto the bottom surface of a lower mold, onto which bottom surface also said hard material particles are sprinkled simultaneously with or after said roughening agent and prior to the insertion of said curable mold material into said lower mold.

* * * * *

UNITED STATES PATENT AND TRADEMARK OFFICE
CERTIFICATE OF CORRECTION

PATENT NO. : 5,439,625
DATED : August 8, 1995
INVENTOR(S) : Peter Schmidt and Peter Michalkiewicz It is certified that error appears in the above-indentified patent and that said Letters Patent is hereby corrected as shown below:

Title page, item [56]   add the following under "FOREIGN PATENT DOCUMENTS":
--2727644   12/78   Germany
  8632856    2/87   Germany
  3707305    9/88   Germany
   225807    7/25   United Kingdom
   446059    4/36   United Kingdom
  2540193    3/77   Germany
  2551345    5/77   Germany--;

Col. 2, line 64, "toughening" should read --roughening--;
Col. 4, line 68, "has" should read --has been--;
Col. 5, line 15, "The" should start a new paragraph on the following line;
Col. 14, line 7-8, "toughening" should read --roughening--;
Col. 14, lines 27-28, "toughening" should read --roughening--;
Col. 14, line 56, "has" should read --has been--;
Col. 14, line 56, "toughening" should read --roughening--;
Col. 14, line 58, "toughening" should read --roughening--;
Col. 14, lines 59-60, "toughening" should read --roughening--;
Col. 15, line 13, "11 599 A1" should read --40 11 599 A1--.

Signed and Sealed this

Twelfth Day of March, 1996

Attest:

BRUCE LEHMAN

Attesting Officer   Commissioner of Patents and Trademarks